Oct. 8, 1935.  M. F. CORRIDAN  2,016,485
CHECK DAMPER
Filed Oct. 26, 1934   2 Sheets-Sheet 1

Inventor
M. F. Corridan

By Clarence A. O'Brien
Attorney

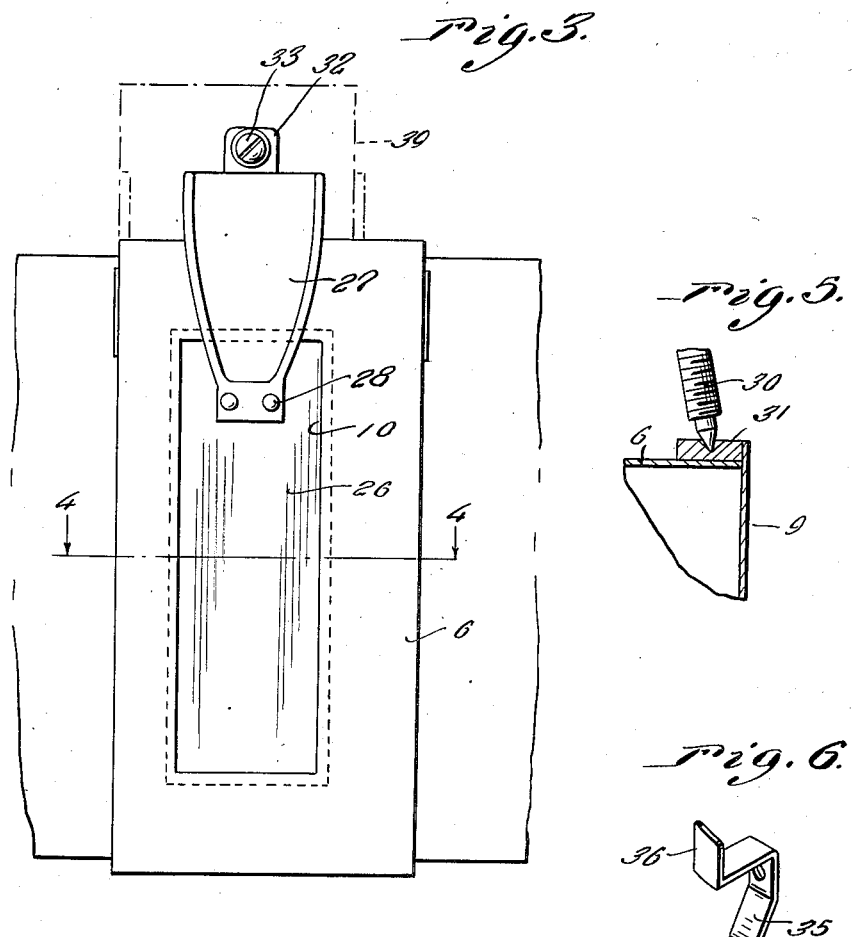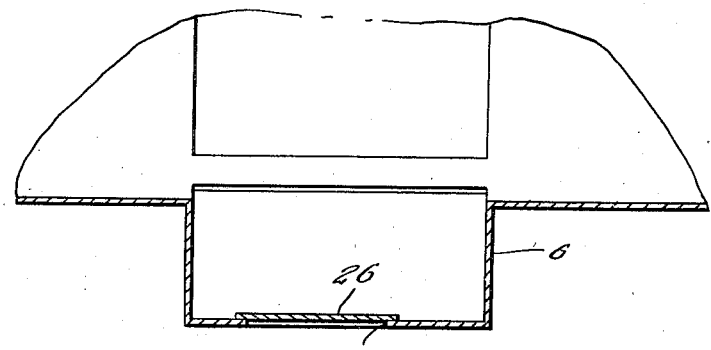

Patented Oct. 8, 1935

2,016,485

UNITED STATES PATENT OFFICE 2,016,485

CHECK DAMPER

Michael F. Corridan, Chicopee, Mass.

Original application May 8, 1934, Serial No. 724,596. Divided and this application October 26, 1934, Serial No. 750,224

1 Claim. (Cl. 236—45)

This invention appertains to new and useful improvements in check dampers and more particularly to a damper of automatic operation.

The principal object of the present invention is to provide a check damper which can be readily adjusted for use under local conditions.

Another important object of the invention is to provide a check damper which can be readily secured against operation.

Another important object of the present invention is to provide a check damper which is specially adapted for use in conjunction with a flue damper.

The present application is to be regarded as a division of my co-pending application Serial No. 724,596, filed May 8, 1934, for a Combination flue baffle and automatic check damper.

In the drawings:

Figure 3 represents a fragmentary side elevational view showing the damper with the mechanism and casing box in broken lines.

Figure 4 represents a fragmentary detailed sectional view taken substantially on line 4—4 of Figure 3.

Figure 5 represents a fragmentary detailed sectional view through one of the balancing screws.

Figure 6 represents a perspective view of the latch member.

Figure 1:
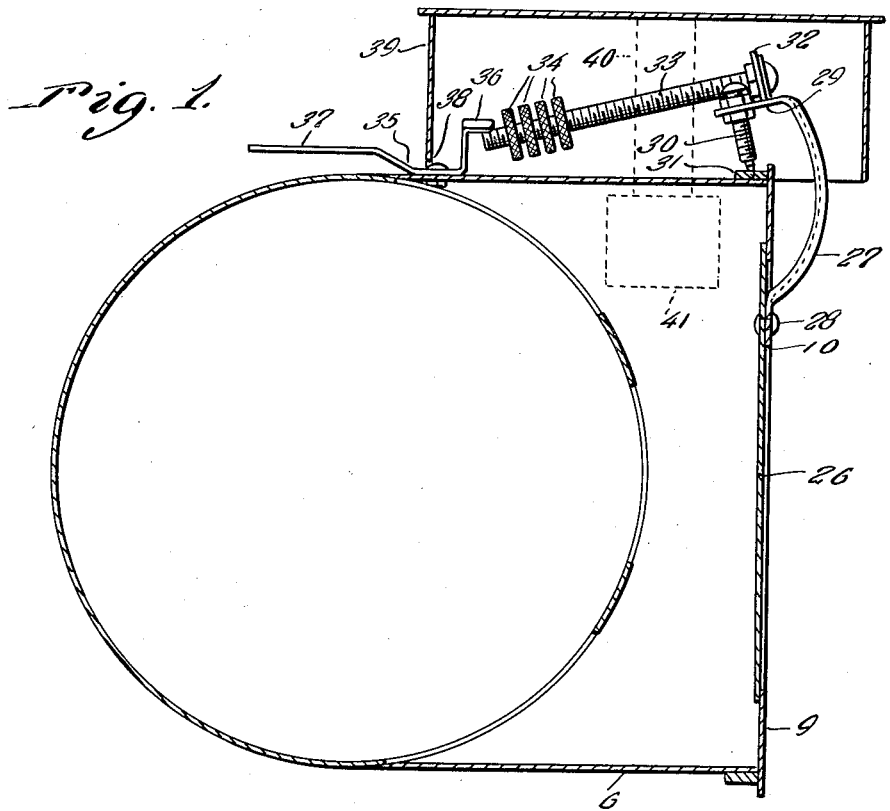
Figure 1 represents a vertical sectional view through the damper.
Figure 2:
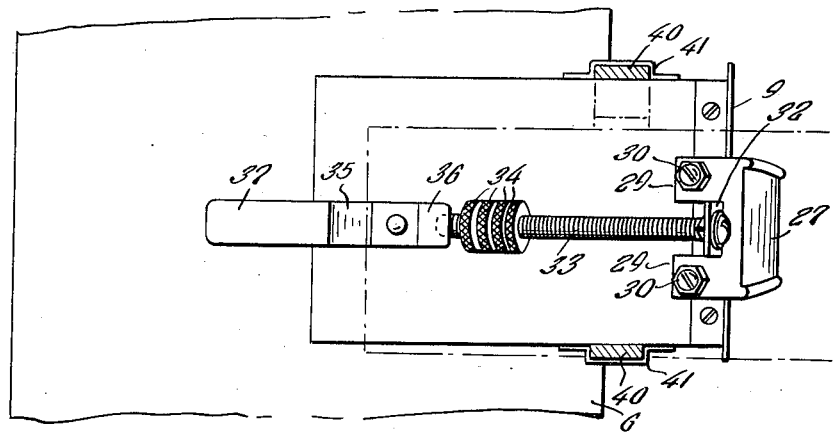
Figure 2 represents a fragmentary top plan view showing the counterbalancing and latching means, with the box removed.

Referring to the drawings wherein like numerals designate like parts, it can be seen that the damper consists of a damper door 26 for normally closing the opening 10 in the housing 6 from the inner side 9 of the housing, this door being provided with an arm 27 secured to one end portion thereof as at 28. The outer end of this arm 27 is provided with laterally disposed portions 29 through which are disposed the needle pointed set screws 30, the pointed ends of which bear into recesses of a bearing block 31 suitably secured to the top of the housing 6. (See Figures 1 and 5.)

This end portion of the arm 27 is provided with an outstanding lug 32 having an opening therein through which a bolt 33 extends, the bolt being supported with its head bearing against the lug 32. The free end portion of the bolt 33 is provided with a plurality of weight members 34 having knurled peripheries.

The bolt may be retained by a detent consisting of the swingable lever 35 having the offset head portion 36 against which the lower end of the bolt 33 can rest, while the handle portion 37 of the lever extends through an opening 38 in the box or housing 39 which encases the bolt 33, screws 30 and a portion of the arms 27, and which is secured to the housing 6 by arms 40 projecting from one side thereof into keepers 41 on opposite sides of the housing 6.

It can be seen that with a damper constructed in this manner, little attention will have to be paid to the working details thereof. In fact, after the proper adjustment of the weight 34 has been obtained on the bolt 33, the only other attention required is the setting of the latch 35 so as to free the damper for operation or secure the same against operation.

While the foregoing specification sets forth the invention in specific terms, it is to be understood that numerous changes in the shape, size and materials may be resorted to without departing from the spirit or scope of the invention as claimed hereinafter.

Having described my invention, what I claim as new is:

An automatic check damper comprising a housing, said housing having an opening in the side thereof, a closure for the opening, an arm extending from the closure, said arm being provided with a balancing screw, a bearing plate on the top side of the housing against which the balancing screw is adapted to bear, said arm being provided with an extension, a plurality of counterbalancing weights adjustably mounted on the said extension, and a swingable detent for engaging the free end of the extension and retaining the same in inoperative position.

MICHAEL F. CORRIDAN.